United States Patent
Song et al.

(10) Patent No.: US 11,218,649 B2
(45) Date of Patent: Jan. 4, 2022

(54) PHOTOGRAPHING METHOD, APPARATUS, AND DEVICE

(71) Applicant: HUAWEI TECHNOLOGIES CO., LTD., Guangdong (CN)

(72) Inventors: Wei Song, Hangzhou (CN); Changcai Lai, Hangzhou (CN); Wei Wang, Hangzhou (CN); Tizheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/205,816

(22) Filed: Mar. 18, 2021

(65) Prior Publication Data

US 2021/0227151 A1 Jul. 22, 2021

Related U.S. Application Data

(63) Continuation of application No. PCT/CN2019/107131, filed on Sep. 21, 2019.

(30) Foreign Application Priority Data

Sep. 21, 2018 (CN) .......................... 201811105629.7

(51) Int. Cl.
*H04N 5/265* (2006.01)
*H04N 5/232* (2006.01)
(Continued)

(52) U.S. Cl.
CPC ......... *H04N 5/265* (2013.01); *H04N 5/23206* (2013.01); *H04N 5/23232* (2013.01);
(Continued)

(58) Field of Classification Search
CPC .............. H04N 5/23216; H04N 7/181; H04N 5/23206; H04N 5/23232; H04N 5/232935;
(Continued)

(56) References Cited

U.S. PATENT DOCUMENTS 8,587,653 B1 * 11/2013 Vidunas ................. H04N 5/247
348/143
9,798,933 B1 10/2017 Meisser et al.
(Continued)

FOREIGN PATENT DOCUMENTS

CN 101431613 A 5/2009
CN 101521754 A 9/2009
(Continued)

OTHER PUBLICATIONS

Schulzrinne et al., "RTP: A Transport Protocol for Real-Time Applications," Network Working Group, Request for Comments: 3550, Jul. 2003, 89 pages.
(Continued)

*Primary Examiner* — Chiawei Chen
(74) *Attorney, Agent, or Firm* — Fish & Richardson P.C.

(57) ABSTRACT

A photographing method is provided. In the method, based on a video call between terminals at two places, each terminal previews, in a preset template, real-time preview video streams of the two parties. The two parties may separately adjust a picture of a local preview stream, and obtain a respective high-definition image through snapping when a preview group photo image is satisfying. Through file backhaul, one terminal can generate a high-resolution remote group photo based on snapped high-definition images of the terminals, a picture adjustment parameter during snapping, and the preset template.

15 Claims, 10 Drawing Sheets

First terminal

Remote group photographing

Second terminal

(51) Int. Cl.
  *H04N 5/247* (2006.01)
  *H04N 5/262* (2006.01)
(52) U.S. Cl.
  CPC ....... *H04N 5/232935* (2018.08); *H04N 5/247* (2013.01); *H04N 5/2624* (2013.01); *H04N 5/2628* (2013.01)
(58) Field of Classification Search
  CPC .... H04N 5/247; H04N 5/2624; H04N 5/2628; H04N 5/265; H04M 1/72439; H04M 1/724; H04M 3/567; H04M 2250/62; G06F 3/04842
  See application file for complete search history.

(56) References Cited

U.S. PATENT DOCUMENTS

| | | | | |
|---|---|---|---|---|
| 10,750,113 B2* | 8/2020 | Takahashi | .............. | H04N 21/47 |
| 2007/0285570 A1* | 12/2007 | Desrosiers | ....... | G08B 13/19621 |
| | | | | 348/565 |
| 2008/0079801 A1* | 4/2008 | Eri | ............................ | H04N 7/15 |
| | | | | 348/14.09 |
| 2008/0316296 A1* | 12/2008 | King | ...................... | H04N 7/152 |
| | | | | 348/14.09 |
| 2011/0060992 A1* | 3/2011 | Jevons | ................... | H04N 7/147 |
| | | | | 715/719 |
| 2012/0200658 A1* | 8/2012 | Duckworth | ............ | H04N 7/152 |
| | | | | 348/14.07 |
| 2013/0050399 A1* | 2/2013 | Gorzynski | ............. | H04N 7/142 |
| | | | | 348/14.08 |
| 2013/0329124 A1 | 12/2013 | Nagamatsu | | |
| 2014/0022332 A1* | 1/2014 | Wang | ..................... | H04N 7/157 |
| | | | | 348/14.07 |
| 2017/0026573 A1* | 1/2017 | Lee | ......................... | H04N 5/247 |
| 2017/0195628 A1* | 7/2017 | Jeong | ..................... | H04N 7/147 |
| 2017/0244930 A1* | 8/2017 | Faulkner | ................ | H04N 7/147 |
| 2017/0339440 A1* | 11/2017 | Galpin | ................. | H04N 21/235 |

FOREIGN PATENT DOCUMENTS

| | | |
|---|---|---|
| CN | 101562682 A | 10/2009 |
| CN | 102158681 A | 8/2011 |
| CN | 102665026 A | 9/2012 |
| CN | 102821253 A | 12/2012 |
| CN | 103716537 A | 4/2014 |
| CN | 104333693 A | 2/2015 |
| CN | 104580930 A | 4/2015 |
| CN | 106331528 A | 1/2017 |
| CN | 106331529 A | 1/2017 |
| CN | 106375193 A | 2/2017 |
| CN | 106488106 A | 3/2017 |
| CN | 106657791 A | 5/2017 |
| CN | 107404617 A | 11/2017 |
| CN | 108495032 A | 9/2018 |
| CN | 109769087 A | 5/2019 |

OTHER PUBLICATIONS

Office Action issued in Chinese Application No. 201811105629.7 dated Dec. 3, 2020, 10 pages.
Office Action issued in Chinese Application No. 201811105629.7 dated Jun. 15, 2021, 9 pages.
PCT International Search Report and Written Opinion issued in International Application No. PCT/CN2019/107131 dated Nov. 27, 2019, 20 pages (with English translation).
Office Action issued in Chinese Application No. 201811105629.7 dated Nov. 3, 2021, 4 pages.

* cited by examiner

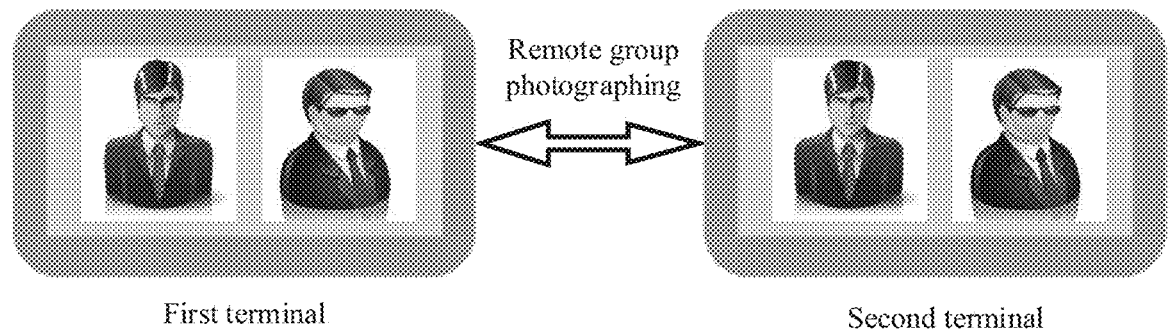
FIG. 6
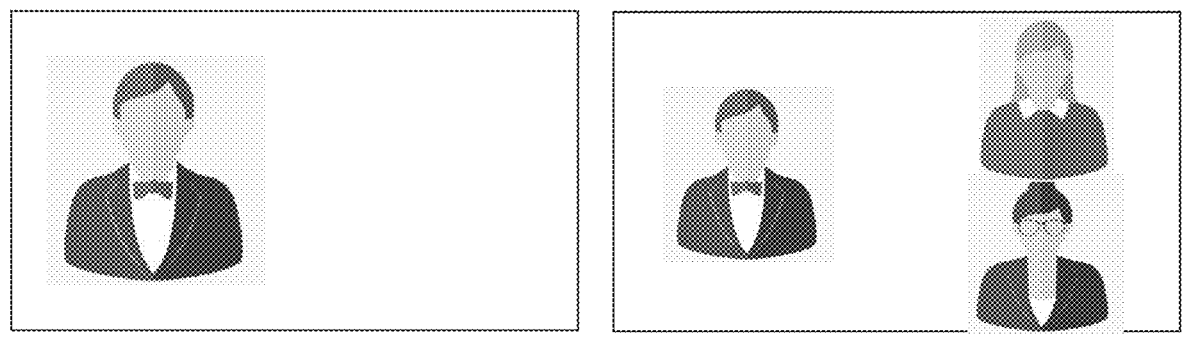
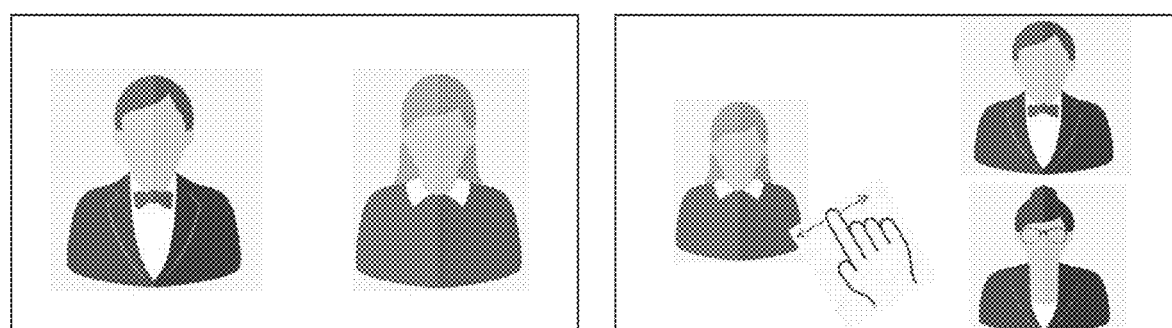
FIG. 7

FIG. 9

| User ID | Resolution identifier | Command number | Quantity of command repetition times |
|---|---|---|---|
| Asynchronous snapping frame timestamp | | | |

(column positions: 0, 8, 16, 24, 32)

- The user ID: used to correspond to an IP address and a port number during negotiation
- The resolution identifier: 0 indicates 4k, 1 indicates 1080p, and 2 indicates 720P
- The command number: 1 indicates synchronous snapping, and 2 indicates asynchronous snapping
- The quantity of command repetition times: 0 indicates 128
- The asynchronous snapping frame timestamp: used to store a timestamp at which a high-definition photo is captured through the asynchronous snapping, and used to freeze a preview picture

FIG. 10

PHOTOGRAPHING METHOD, APPARATUS, AND DEVICE

CROSS-REFERENCE TO RELATED APPLICATIONS

This application is a continuation of International Application No. PCT/CN2019/107131, filed on Sep. 21, 2019, which claims priority to Chinese Patent Application No. 201811105629.7, filed on Sep. 21, 2018. The disclosures of the aforementioned applications are hereby incorporated by reference in their entireties.

TECHNICAL FIELD

The present invention relates to the field of terminal technologies, and in particular, to a photographing method and apparatus, and a device.

BACKGROUND

With continuous development of communications technologies and terminal hardware, performance of a camera of a mobile phone becomes increasingly better, and photographing also becomes increasingly popular. A user can record a life status of the user and keep beautiful things around the user by photographing anytime and anywhere, which is very convenient.

It is a great thing to reunite with relatives. When the user and a friend need to take a group of photo at a same place, the user can use a tripod or invite someone else to take the group photo of the user and the friend. However, modern fast-paced work and life often separate people from their relatives and friends, making it impossible for them to take a group photo.

Some people produce a group photo of persons at different places through post-processing, for example, PS. This method not only requires professional cropping and image retouching skills but also consumes a large amount of time. In addition, the method of obtaining group photos is complex. Because a viewfinder cannot be previewed in real time, and actions and expressions of both parties cannot match to produce a good visual effect. This cannot meet requirements of free shooting of a wide range of users, and has severe limitations.

SUMMARY

With development and evolution of modern network and terminal technologies (for example, a 5G network with a low latency and high bandwidth, a high-quality image sensor, and high-definition video communication), a user will enjoy better video interconnection experience, and more imagination space is provided for remote group photographing of multi-camera interconnection.

Embodiments of the present invention provide a photographing method. Specifically, a remote group photographing method for a real-time video preview may be provided, and a group photo effect of "what you see is what you get" is achieved in a shooting process. This resolves problems such as time consumption and a failure of remote interaction that are caused by subsequent image retouching and cropping, and improves photographing experience of a user.

Specific technical solutions provided in the embodiments of the present invention are as follows.

According to a first aspect, an embodiment of the present invention provides a photographing method. The method specifically includes: A first terminal obtains a first video stream and a second video stream, where the first video stream is corresponding to a preview video stream of a first scenario obtained by the first terminal, and the second video stream is corresponding to a preview video stream of a second scenario obtained by a second terminal; the first video stream and the second video stream are presented on a display interface of the first terminal based on a preset template, where the preset template includes a first region and a second region, the first region is used to present the first video stream, and the second region is used to present the second video stream; the first terminal shoots the first scenario to obtain a first image, where resolution of the first image is higher than resolution of the first video stream; the first terminal obtains a second image, where the second image is obtained by the second terminal by shooting the second scenario, and resolution of the second image is higher than resolution of the second video stream; the first terminal obtains a first picture adjustment parameter that is used when the first terminal obtains the first image through shooting, and the first terminal obtains a second picture adjustment parameter that is used when the second terminal obtains the second image through shooting, where the first picture adjustment parameter and/or the second picture adjustment parameter separately includes at least one of a zoom ratio, a rotation angle, a translation displacement, or a flipping angle; and the first terminal generates a group photo image based on the first image, the first picture adjustment parameter, the second image, the second picture adjustment parameter, and the preset template.

According to a second aspect, an embodiment of the present invention provides a photographing apparatus. The apparatus further includes:

an obtaining module, configured to obtain a first video stream and a second video stream, where the first video stream is corresponding to a preview video stream of a first scenario obtained by the first terminal, and the second video stream is corresponding to a preview video stream of a second scenario obtained by a second terminal; a display module, configured to present, based on a preset template, the first video stream and the second video stream on a display interface of the first terminal, where the preset template includes a first region and a second region, the first region is used to present the first video stream, and the second region is used to present the second video stream; a collection module, configured to shoot the first scenario to obtain a first image, where resolution of the first image is higher than resolution of the first video stream; a receiving module, configured to obtain a second image, where the second image is obtained by the second terminal by shooting the second scenario, and resolution of the second image is higher than resolution of the second video stream; an adjustment module, configured to: obtain a first picture adjustment parameter that is used when the first terminal obtains the first image through shooting, and obtain a second picture adjustment parameter that is used when the second terminal obtains the second image through shooting, where the first picture adjustment parameter and/or the second picture adjustment parameter may separately include at least one of a zoom ratio, a rotation angle, a translation displacement, or a flipping angle; and an image processing module, configured to generate a group photo image based on the first image, the first picture adjustment parameter, the second image, the second picture adjustment parameter, and the preset template.

According to the technical solutions of the foregoing method and apparatus provided in the embodiments of the present invention, remote group photographing can be implemented, and a high-definition group photo image can be formed. In addition, postures can be freely controlled by both parties, and "what you see is what you get". This improves user experience.

According to the first aspect or the second aspect, in a possible design, the first terminal controls a display interface of the second terminal to present the first video stream and the second video stream based on the preset template. A mode in which the second terminal presents the first video stream and the second video stream is the same as a mode in which the first terminal presents the first video stream and the second video stream. Correspondingly, the foregoing apparatus may further include a control module, and the method may be executed by the control module. In this solution, it is ensured that arrangement modes of preview pictures displayed in a plurality of terminals are consistent, so that users of terminals can have consistent perception of a group photographing result, thereby better adjusting postures and pictures of the users of the terminals.

According to the first aspect or the second aspect, in a possible design, that the first terminal shoots the first scenario to obtain a first image includes: The first terminal receives a first snapping instruction, and shoots the first scenario to obtain the first image. That the first terminal obtains a second image includes: The first terminal forwards the first snapping instruction to the second terminal, to enable the second terminal to shoot the second scenario to obtain the second image, and send the second image to the first terminal; and the first terminal receives the second image sent by the second terminal. The method may be cooperatively executed by the collection module and the receiving module. This is a synchronous snapping mode, which enables a group photo initiator to have absolute control over a group photo, facilitating operations.

According to the first aspect or the second aspect, in a possible design, that the first terminal shoots the first scenario to obtain a first image includes: The first terminal receives a first snapping instruction, and shoots the first scenario to obtain the first image. That the first terminal obtains a second image includes: The second terminal receives a second snapping instruction, shoots the second scenario to obtain the second image, and sends the second image to the first terminal; and the first terminal receives the second image. The method may be cooperatively executed by the collection module and the receiving module. The second snapping instruction may be controlled by a user of the second terminal. This is an asynchronous snapping mode, which can enable a participant in a group photo to have free control over a group photo, give full play to a subjective will of each participant, and have good interaction.

According to the first aspect or the second aspect, in a possible design, that the first terminal receives a first snapping instruction, and shoots the first scenario to obtain the first image includes: The first terminal invokes a photographing function to shoot the first scenario at a first snapping instruction time point to obtain the first image; or the first terminal finds, in a video collection buffer, an uncoded buffered image that is of the first scenario and that is corresponding to the first snapping instruction time point, and uses the buffered image as the first image. The method may be executed by the collection module. This is a method for obtaining a high-definition image, and is intended to generate a high-definition image that is different from a screenshot or a low-resolution video frame in the prior art. Therefore, a high-definition group photo can be generated subsequently.

According to the first aspect or the second aspect, in a possible design, the resolution of the second image is the same as the resolution of the first image. In this technical solution, shooting parameters of all group photo terminals can be unified, and it is more coordinated during picture fusion.

According to the first aspect or the second aspect, in a possible design, an aspect ratio of the second image is the same as an aspect ratio of the first image. In this technical solution, shooting parameters of all group photo terminals can be unified, and it is more convenient for cropping.

According to the first aspect or the second aspect, in a possible design, that the first terminal generates a group photo image based on the first image, the first picture adjustment parameter, the second image, the second picture adjustment parameter, and the preset template includes: The first terminal determines a first sub-image based on the first image, the first picture adjustment parameter, and the first region; the first terminal determines a second sub-image based on the second image, the second picture adjustment parameter, and the second region; and the first terminal generates the group photo image based on the first sub-image, the second sub-image, and the preset template. The method may be executed by the image processing module.

According to the first aspect or the second aspect, in a possible design, operations such as calling, authentication, declining, and holding of two or more parties in a group photo are completed according to a video communication signaling protocol such as a SIP or an XMPP, and a real-time preview control command and data are transferred through the signaling protocol.

According to the first aspect or the second aspect, in a possible design, the terminal further manages a preview picture, and needs to ensure that when all terminals participating in group photographing establish communication to take a group photo, pictures displayed in the terminals are consistent (for example, but not limited to picture content, a relative position/size, and the like). In addition, any terminal participating in group photographing may switch between a front camera and a rear camera, to obtain different angles of view. Switching of picture content caused by switching of a camera may be synchronously performed in each terminal that participates in group photographing. This ensures that a same picture is displayed in all terminals during group photographing.

According to the first aspect or the second aspect, in a possible design, a terminal that initiates a group photo may transmit a snapping command to another group photo party in a manner such as by using a video stream RTP extension field or signaling. The snapping command includes information such as resolution and an aspect ratio, to ensure that all group photo parties use a same parameter for snapping.

According to the first aspect or the second aspect, in a possible design, to ensure high definition of the group photo, a snapped high-definition photo needs to be returned to a group photo initiator, and the group photo is generated locally on the initiator. Optionally, the initiator delivers the group photo to each group photo party. Alternatively, each group photo party exchanges a snapped high-definition photo with each other, and generates the group photo locally on each group photo party. Alternatively, each group photo party sends a snapped high-definition photo to a server, and the server generates the group photo and returns the group photo to each group photo party.

According to the first aspect or the second aspect, in a possible design, a size of a group photo preview window is less than a size of an image collected by a camera, and a user may perform picture adjustment on the preview window in three modes: "default, manual, and intelligent". In a default mode, a system automatically selects a central region of the collected image as a preview picture. In a manual mode, the user can adjust (translate/rotate/zoom) a preview picture of the present solution by using a gesture or menu. In an intelligent mode, a system automatically selects a preview picture from a picture collected by the camera by using technologies such as a region of interest recognition and facial detection. In the three modes, pictures of group photo parties are synchronously refreshed, to adjust a result. This ensures an effect of "what you see is what you get" until the user is satisfied.

More specifically, in the foregoing possible technical implementation, a processor can invoke a program and an instruction in a memory to perform corresponding processing, for example, enabling the camera, controlling the camera to collect the image, performing specific algorithm processing on the collected image, and generating the final high-definition group photo image.

According to a third aspect, an embodiment of the present invention provides a terminal device, including a memory, a processor, a bus, a camera, and a transceiver. The memory, the camera, the transceiver, and the processor are connected through the bus. The camera is configured to collect an image signal under control of the processor. The transceiver is configured to receive and send an instruction and data. The memory is configured to store a computer program and an instruction. The processor is configured to invoke the computer program and the instruction that are stored in the memory to control the camera and the transceiver, and is further specifically configured to enable the terminal device to perform any one of the foregoing possible design methods.

According to the third aspect, in a possible design, the terminal device further includes an antenna system. The antenna system receives and sends a wireless communication signal under control of the processor, to implement wireless communication with a mobile communications network. The mobile communications network includes one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network, and an LTE network.

The foregoing method, apparatus, and device may be applied to a scenario in which photographing software built in a terminal is used for shooting, or may be applied to a scenario in which third-party photographing software is run in a terminal to perform shooting. Same software can integrate all group shooting functions of all shooting parties.

BRIEF DESCRIPTION OF DRAWINGS

FIG. 6 is a schematic diagram of display interfaces of terminals during remote group photographing according to an embodiment of the present invention;

FIG. 7 is a schematic diagram of role distribution of participants during remote group photographing according to an embodiment of the present invention;

FIG. 9 is a schematic diagram of a group photo effect in a remote group photographing intelligent mode according to an embodiment of the present invention;

FIG. 10 is a schematic diagram of a snapping command according to an embodiment of the present invention;

DESCRIPTION OF EMBODIMENTS

The following clearly and describes the technical solutions in embodiments of the present invention with reference to the accompanying drawings in the embodiments of the present invention. It is clear that the described embodiments are merely some but not all of the embodiments of the present invention. All other embodiments obtained by persons of ordinary skill in the art based on the embodiments of the present invention without creative efforts shall fall within the protection scope of the present invention.

In the embodiments of the present invention, a terminal may be a device that provides a user with photographing and/or data connectivity, a handheld device with a wireless connection function, or another processing device connected to a wireless modem, for example, a digital camera, a single-lens reflex camera, a video camera, a mobile phone (or referred to as a "cellular" phone), or a smartphone. The terminal may be a portable, pocket-sized, handheld, and wearable device (for example, a smartwatch), a tablet computer, a personal computer (PC, Personal Computer), a PDA (Personal Digital Assistant), a vehicle-mounted computer, a drone, an aerial device, or the like FIG. 1 is a schematic diagram of an optional hardware structure of a terminal 100.

Figure 1:
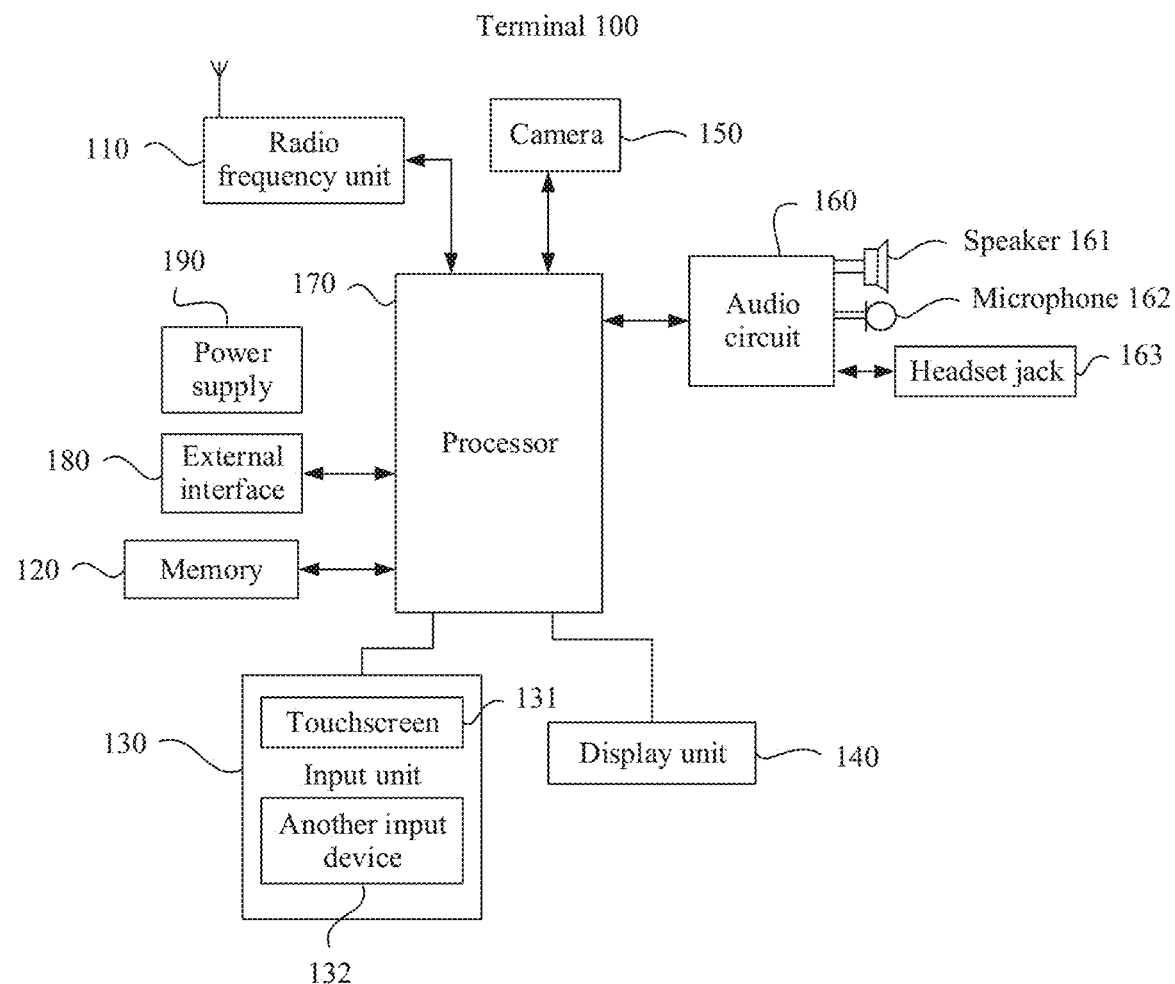
FIG. 1 is a schematic structural diagram of a terminal according to an embodiment of the present invention.

Referring to FIG. 1, the terminal 100 may include components such as a radio frequency unit 110, a memory 120, an input unit 130, a display unit 140, a camera 150, an audio circuit 160, a speaker 161, a microphone 162, a processor 170, an external interface 180, and a power supply 190. Persons skilled in the art may understand that FIG. 1 is merely an example of a portable multi-function apparatus, and does not constitute a limitation on the portable multi-function apparatus. The portable multi-function apparatus may include more or fewer components than those shown in the figure, or combine some components, or include different components.

The camera 150 is configured to collect an image or a video, and may be triggered and enabled through an application program instruction, to implement a photographing or a video recording function. The camera may include components such as an imaging lens, a light filter, and an image sensor. Light rays emitted or reflected by an object enter the imaging lens and converge on the image sensor through the light filter. The imaging lens is mainly configured to converge, into an image, light emitted or reflected by all objects in a photographing angle of view (which may also be referred to as a to-be-shot scenario, to-be-shot objects, a target scenario, or target objects, and may also be understood as a scenario image that a user expects to shoot). The light filter is mainly configured to filter out a redundant light wave (for example, a light wave except visible light, such as infrared light) in light rays. The image sensor is mainly configured to: perform optical-to-electrical conversion on a received optical signal, convert the optical signal into an electrical signal, and input the electrical signal to the processor 170 for subsequent processing. Cameras may be located in front of the terminal device, or may be located on the back of the terminal device. A quantity and a specific arrangement mode of the cameras may be flexibly determined based on a requirement of a designer or a vendor policy. This is not limited in this application.

The input unit 130 may be configured to receive input digit or character information, and generate a key signal input related to user settings and function control of the portable multi-function apparatus. Specifically, the input unit 130 may include a touchscreen 131 and another input device 132. The touchscreen 131 may collect a touch operation (for example, an operation performed by the user on the touchscreen or near the touchscreen by using any proper object such as a finger, a joint, or a stylus) of the user on or near the touchscreen, and drive a corresponding connection apparatus based on a preset program. The touchscreen may detect a touch action of the user on the touchscreen, convert the touch action into a touch signal, send the touch signal to the processor 170, and can receive and execute a command sent by the processor 170. The touch signal includes at least touch point coordinate information. The touchscreen 131 may provide an input interface and an output interface between the terminal 100 and the user. In addition, the touchscreen may be implemented in various types such as a resistive type, a capacitive type, an infrared type, and a surface acoustic wave type. In addition to the touchscreen 131, the input unit 130 may further include the another input device. Specifically, the another input device 132 may include but is not limited to one or more of a physical keyboard, a function key (such as a volume control key 132 or a power on/off key 133), a trackball, a mouse, a joystick, and the like.

The display unit 140 may be configured to display information input by the user or information provided for the user, and various menus of the terminal 100. In this embodiment of the present invention, the display unit is further configured to display an image obtained by the device by using the camera 150. The image may include a preview image in some shooting modes, a shot initial image, and a target image on which a specific algorithm is processed after shooting is performed.

Further, the touchscreen 131 may cover a display panel 141. After detecting a touch operation on or near the touchscreen 131, the touchscreen 131 transfers the touch operation to the processor 170 to determine a type of a touch event. Then the processor 170 provides a corresponding visual output on the display panel 141 based on the type of the touch event. In this embodiment, the touchscreen and the display unit may be integrated into one component to implement input, output, and display functions of the terminal 10. For ease of description, in this embodiment of the present invention, a touch display screen represents a function set of the touchscreen and the display unit. In some embodiments, the touchscreen and the display unit may alternatively be used as two independent components.

The memory 120 may be configured to store an instruction and data. The memory 120 may mainly include an instruction storage area and a data storage area. The data storage area may store data such as a media file and a text. The instruction storage area may store software units such as an operating system, an application, and an instruction required by at least one function, or a subset and an extension set of the software units. The memory 120 may further include a non-volatile random access memory. The memory 120 provides the processor 170 with hardware, software, and data resources for managing a calculation processing device, supports control software and an application, and is further configured to: store a multimedia file, and store a running program and an application.

The processor 170 is a control center of the terminal 100, and is connected to various parts of an entire mobile phone through various interfaces and lines. The processor 170 performs various functions of the terminal 100 and processes data by running or executing the instruction stored in the memory 120 and invoking the data stored in the memory 120, to perform overall monitoring on the mobile phone. Optionally, the processor 170 may include one or more processing units. Preferably, the processor 170 may be integrated with an application processor and a modem processor. The application processor mainly processes an operating system, a user interface, an application program, and the like. The modem processor mainly processes wireless communication. It may be understood that alternatively, the modem processor may not be integrated into the processor 170. In some embodiments, the processor and the memory may be implemented on a single chip. In some embodiments, the processor and the memory may be separately implemented on independent chips. The processor 170 may be further configured to: generate a corresponding operation control signal, and send the operation control signal to a corresponding component in the calculation processing device, and read and process data in software, especially read and process the data and the program in the memory 120. Therefore, function modules in the processor 170 perform corresponding functions, to control a corresponding component to perform an operation as required by an instruction.

The radio frequency unit 110 may be configured to receive and send a signal in an information receiving and sending process or a call process. Particularly, the radio frequency unit 110 delivers downlink information to the processor 170 for processing after receiving the downlink information from a base station. In addition, the radio frequency unit 110 sends related uplink data to the base station. Usually, an RF circuit includes but is not limited to an antenna, at least one amplifier, a transceiver, a coupler, a low noise amplifier (Low Noise Amplifier, LNA), a duplexer, and the like. In addition, the radio frequency unit 110 may further communicate with a network device and another device through wireless communication. The wireless communications may use any communications standard or protocol, which includes but is not limited to a global system for mobile communications (global system for mobile communications, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (short message service, SMS), and the like.

The audio frequency circuit 160, the speaker 161, and the microphone 162 may provide an audio interface between the user and the terminal 100. The audio frequency circuit 160 may transmit, to the speaker 161, an electrical signal converted from received audio data, and the speaker 161 converts the electrical signal into a sound signal for outputting. On the other hand, the microphone 162 is configured to collect a sound signal, and may further convert a collected sound signal into an electrical signal. The audio frequency circuit 160 receives the electrical signal, converts the electrical signal into audio data, outputs the audio data to the processor 170 for processing, and then sends processed audio data to, for example, another terminal through the radio frequency unit 110, or outputs processed audio data to the memory 120 for further processing. The audio frequency circuit may also include a headset jack 163, configured to provide a connection interface between the audio frequency circuit and a headset.

The terminal 100 further includes the power supply 190 (such as a battery) that supplies power to each component. Preferably, the power supply may be logically connected to the processor 170 by using a power supply management system, to implement functions such as charging, discharging, and power consumption management by using the power supply management system.

The terminal 100 further includes the external interface 180. The external interface may be a standard micro-USB port, or may be a multi-pin connector. The external interface may be configured to connect the terminal 100 to another apparatus for communication, or may be configured to connect to a charger to charge the terminal 100.

Although not shown, the terminal 100 may further include a flash light, a wireless fidelity (wireless fidelity, Wi-Fi) module, a Bluetooth module, sensors with various functions, and the like. Details are not described herein. Some or all of the methods described below may be applied to the terminal shown in FIG. 1.

An application scenario of the present invention is an application scenario in which two or more people take a group photo due to social, emotional, entertaining requirements of a user. However, if the people taking a group photo do not appear in a same place or at a same time point, the application scenario cannot be implemented. For the requirement, the present invention proposes to implement remote interactive group photographing and creative group photographing between users of intelligent terminals (mobile phones/tablets) and between users of home cameras (set-top boxes/IPCs/smart speakers). When a festival comes but reunion cannot be realized, couples cannot meet each other thousands of miles apart. The remote interactive group photographing is used to meet entertaining and social requirements. Currently, a user usually uses puzzle software to perform post-splicing to achieve a group photo effect. This lacks time alignment (which means "what you see is what you get", and the time alignment means that pictures of both parties may appear in a picture at a same time point to interact with each other), and posture interaction is insufficient. Both group photo resolution and overall posture presentation cannot meet the requirements of the user.

Figure 2:
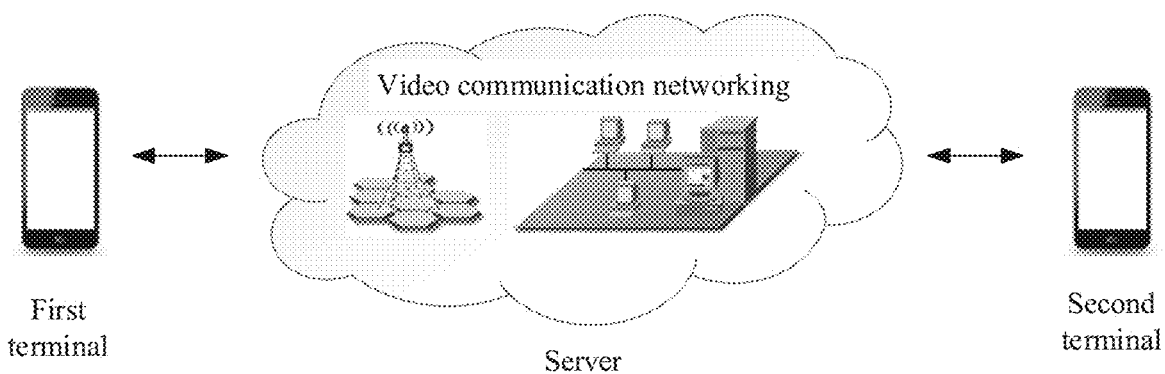
FIG. 2 is an architectural diagram of a remote group photographing system according to an embodiment of the present invention.

The present invention may be applied to a remote collaborative group photographing scenario. A system architecture is shown in FIG. 2. The system includes at least two intelligent terminals (for example, a first terminal and a second terminal). Further, specific implementation may be as follows: a mobile phone, a camera, a pad, a computer, a wearable device, and the like that can take a photo and are communication devices) and a server (for example, video communication networking). A user initiates a group photo request to a friend through the intelligent terminal. Once the first terminal and the second terminal establish communication through the server, the first terminal and the second terminal may transmit data, such as an image file and an instruction, to each other through the server, to implement a real-time image or video preview, display picture adjustment, photographing control, photo backhaul, group photo generation, and the like. This improves usability of remote group photographing.

Figure 3:
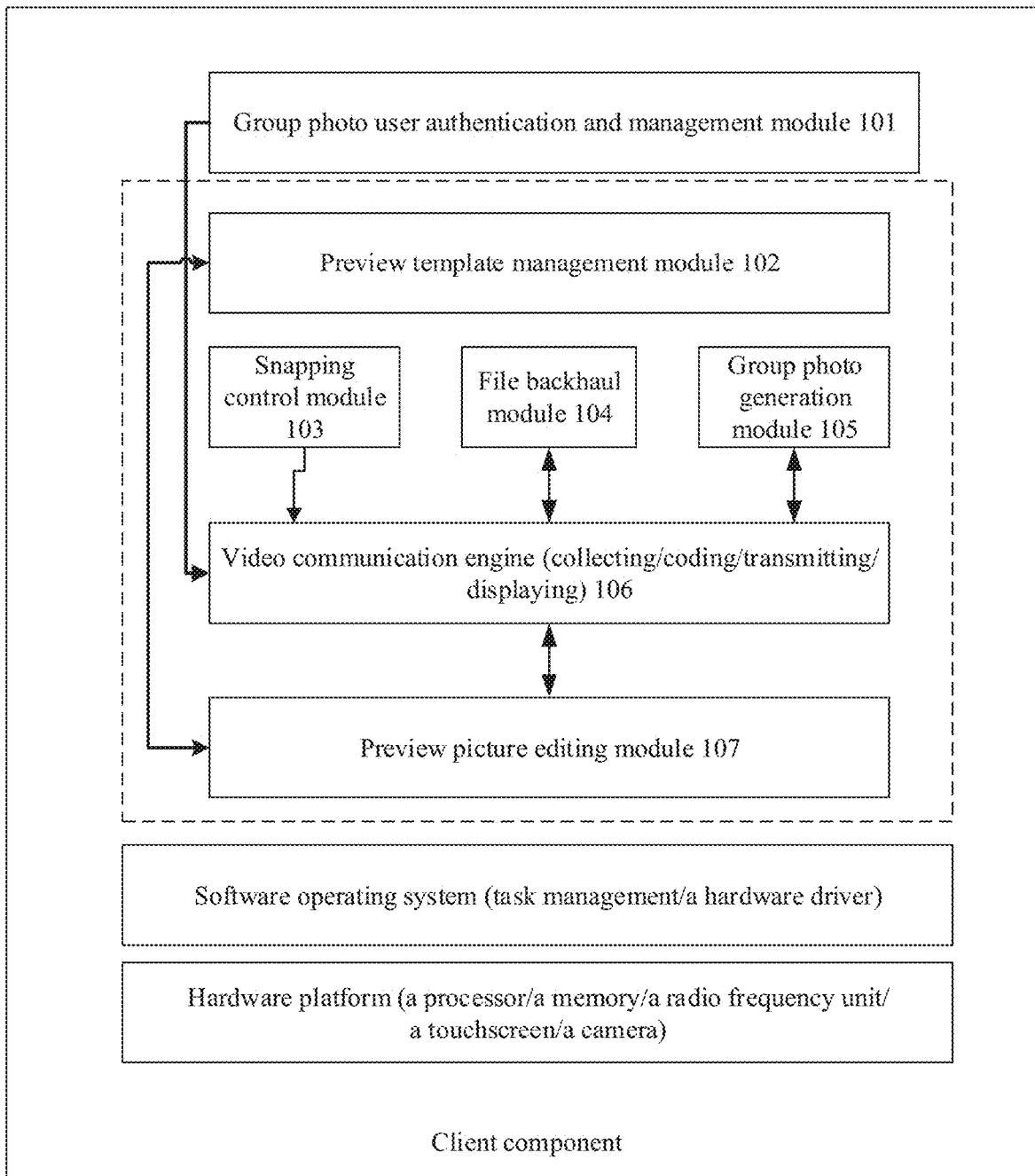
FIG. 3 is a schematic diagram of a client component of a terminal according to an embodiment of the present invention.

An implementation product form of the present invention may be an intelligent terminal (a mobile phone/a tablet/a portable computer) or a home camera (a smart camera/a visual set-top box/a smart speaker), and may be specifically an application program or software in the intelligent terminal. The present invention is deployed on the terminal device, and may provide a remote collaborative group photographing function for the user based on software installation or a software upgrade and hardware invoking and cooperation. In a specific implementation process, the terminal may include some necessary client components. As shown in FIG. 3, with support of a hardware platform (a processor/a memory/a radio frequency unit/a touchscreen/a camera) and a software operating system (task management/a hardware driver), an application program for remote group photographing may be run. The program may include the following modules: a group photo user authentication and management module 101, a preview template management module 102, a snapping control module 103, a file backhaul module 104, a group photo generation module 105, a video communication engine 106 (collecting/coding/transmitting/displaying), a preview picture editing module 107, and the like. Functions of each module are described as follows.

The group photo user authentication and management module 101: Operations such as calling, authentication, declining, and holding of two or more parties in a group photo are completed according to a video communication signaling protocol such as a SIP or an XMPP, and a real-time preview control command and data are transferred through the signaling protocol.

The preview template management module 102: A preview template and a theme may be selected by the user. The template refers to a segmentation mode of a group photo picture (for example, but not limited to an equal division mode, a picture-in-picture mode, a diagonal mode, and a puzzle mode, and it should be understood that the puzzle mode includes different quantities of sub-pictures and different arrangement modes of the sub-pictures), and the theme refers to a template and a filter style of the picture (for example, but not limited to a birthday style, a holiday style, a theme designed by the user, and an online theme). The module further manages a preview picture, and needs to ensure that when all terminals participating in group photographing establish communication to take a group photo, pictures displayed in the terminals are consistent (for example but not limited to picture content, a relative position or size, and the like). In addition, any terminal participating in group photographing may switch between a front camera and a rear camera, to obtain different shooting angles of view. The preview template management module 102 can synchronously perform switching of picture content caused by switching of a camera in each terminal that participates in group photographing. This ensures that a same picture is displayed in all terminals during group photographing.

The snapping control module 103: A snapping operation (including but not limited to a key, voice activation, a gesture, and the like) of the user is received, and capturing of a high-definition photo is triggered. In a specific implementation process, a terminal that initiates a group photo may transmit a snapping command to another group photo party in a manner such as by using a video stream RTP extension field or signaling. The snapping command includes information such as resolution and an aspect ratio, to ensure that all group photo parties use a same parameter for snapping. During group photographing, there may be two modes: synchronous snapping and asynchronous snapping. The synchronous snapping means that when a unified snapping command is delivered to all group photo parties at the same time, no user response is required, and all group photo parties take high-definition photos of their own scenarios synchronously. Usually, a controlling party takes the photos. The asynchronous snapping means that a snapping triggering instruction is delivered to all group photo parties, and each group photo party needs to respond to and confirm. A group photo party who performs snapping confirmation can independently take a snapshot of the group photo party. After a group photo party completes taking a snapshot, a preview picture corresponding to the user is frozen immediately. Another user can continue adjusting a posture until all group photo parties complete taking a snapshot. All preview pictures are frozen, and the group photo is taken. It should be understood that the snapshot herein may be an uncoded high-definition image shot when the terminal shoots a video stream. Alternatively, the snapshot herein may be a high-definition image taken by directly invoking the camera Resolution of these snapped images is higher than resolution of images of a video stream transmitted between terminals. These snapped high-definition images are "original materials" that generate the final group photo. Therefore, high-definition quality of the group photo is ensured.

The file backhaul module 104: it should be understood that during real-time video preview, traffic bandwidth and power consumption need to be considered for image transmission. Therefore, picture clarity of a preview image is lower than clarity obtained when the user independently invokes the camera to take a photo. For example, a typical scenario of a real-time video is 1280×720, 15 frames @768 kbps, and resolution of a photo taken by the mobile phone can reach 3264×1840. Therefore, in the present invention, to ensure high definition of the group photo, a snapped high-definition photo needs to be returned to a group photo initiator, and the group photo is generated locally on the initiator. Optionally, the initiator delivers the group photo to each group photo party. Alternatively, each group photo party exchanges a snapped high-definition photo with each other, and generates the group photo locally on each group photo party. Alternatively, each group photo party sends a snapped high-definition photo to the server, and the server generates the group photo and returns the group photo to each group photo party. With development of terminal performance and 5G network technologies, an ultra-high-definition real-time preview stream can also be used, and the group photo is generated based on video preview data. In this way, the photo does not need to be returned. This module is responsible for receiving, sending, and storing the snapped photo.

The group photo generation module 105: The backhaul photo of the file backhaul module 104 is obtained, and cropping and splicing are performed based on a stored preview picture editing parameter (rotation, zooming, or the like) provided by the preview picture editing module 107, to obtain an ultra-high-definition group photo consistent with a preview of each group photo party.

The video communication engine 106: This module is mainly responsible for real-time processing such as collection, encoding, transmission, decoding, and display performed by the camera on a preview picture of a scenario. This module is a basic component of video communication. The video communication engine 106 receives an IP address and port number information that are of the group photo party and that are obtained through negotiation of the group photo user authentication and management module 101, and is responsible for transmitting data such as snapping control data, an image file, a preview video stream of the snapping control module 103, the file backhaul module 104, and the group photo generation module 105 to each group photo party by using a corresponding IP address and port number. The video communication engine 106 interacts with the preview picture editing module 107. The user adjusts the picture by using the preview picture editing module 107. The video communication engine 106 is further configured to perform picture adjustment processing, displaying, and rendering. In addition, data transmission between different intelligent terminals may be further implemented through the video communications engine 106.

The preview picture editing module 107: Because a size of a group photo preview window is less than a size of an image collected by the camera, the user may perform picture adjustment on the preview window in three modes: "default, manual, and intelligent". In a default mode, the system automatically selects a central region of the collected image as a preview picture. In a manual mode, the user can adjust (translate/rotate/zoom) a preview picture by using a gesture or menu. In an intelligent mode, a system automatically selects a preview picture from a picture collected by the camera by using technologies such as a region of interest recognition and facial detection. In the three modes, pictures of the group photo parties are synchronously refreshed, to adjust a result. This ensures an effect of "what you see is what you get" until the user is satisfied.

It should be understood that names and descriptions of the foregoing components do not constitute a limitation on implementation of terminal software, and some component functions may be partially overlapped. An effect of the terminal may be different due to different roles of the terminal during group photographing.

It should be understood that, in the embodiments of the present invention, all terminals participating in group photographing may be referred to as group photo participants. A first party that actively initiates a group photo may be referred to as a group photo initiator (which may be referred to as an initiator for short). Any party that makes a response is referred to as a group photo responder (which may be referred to as a responder or a group photo party for short), and there may be one or more group photo responders. A quantity of group photo participants is not limited in the embodiments of the present invention.

Figure 4:
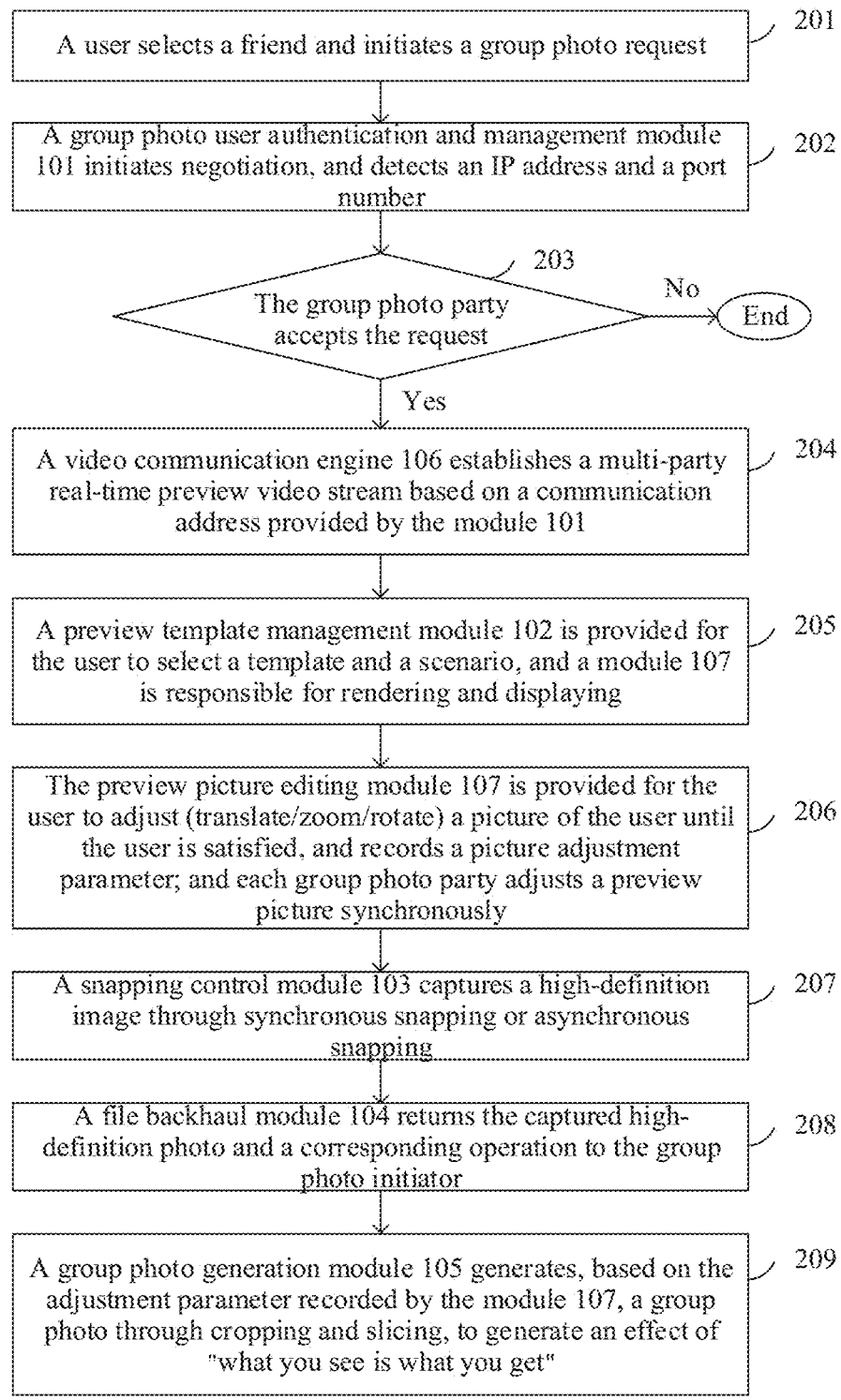
FIG. 4 is a flowchart of a remote group photographing example method according to an embodiment of the present invention.

As shown in FIG. 4, a remote group photographing example is as follows.

Step 201: A user selects a friend and initiates a group photo request, for example, the first terminal (initiator) initiates the group photo request to the second terminal (responder).

Step 202: The group photo user authentication and management module 101 initiates negotiation, and detects an IP address and a port number. For example, the group photo user authentication and management module 101 of the first terminal establishes a connection and a handshake with the group photo user authentication and management module 101 of the second terminal. Specifically, for example, the group photo user authentication and management module 101 of the first terminal initiates a call to the group photo user authentication and management module 101 of the second terminal, which covers firewall traversal. Finally, the group photo user authentication and management module 101 of the first terminal obtains a communication IP address and a port number of the second terminal.

Step 203: if the second terminal accepts the group photo request, step 204 is performed. If the second terminal does not accept the group photo request, group photographing fails to be established, and a procedure ends.

Step 204: The video communication engine 106 establishes a multi-party real-time preview video stream based on the communication address provided by the group photo user authentication and management module 101, for example, but not limited to setting up a video call. In this case, shooting functions of both the first terminal and the second terminal are enabled, and real-time image collection starts. After encoding and network transmission, the preview video stream is transmitted to the server, and then forwarded to another terminal. For example, the first terminal may encode a scenario preview image in a camera of the first terminal as a first video stream for transmission, and may further forward the first video stream to the second terminal through the server. Likewise, the second terminal may encode a scenario preview image in a camera of the second terminal as a second video stream for transmission, and may further forward the second video stream to the first terminal through the server.

Figure 5:
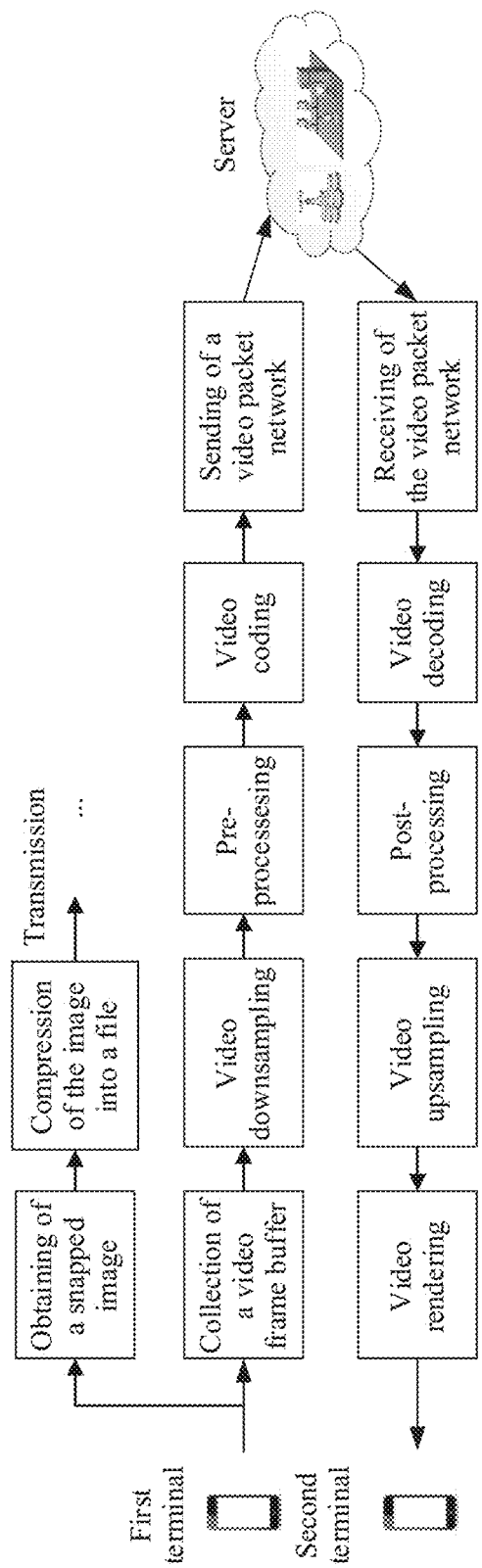
FIG. 5 is a diagram of a signal flow between terminals during remote group photographing according to an embodiment of the present invention.

In a specific implementation process, referring to FIG. 5, the first terminal is used as an example. The first terminal collects the scenario image in the camera of the first terminal, collects a video frame buffer, and sends a video packet over a network based on video downsampling, pre-processing, and video encoding. The second terminal receives the video packet over a network forwarded through the server, and subsequently, performs operations such as video decoding, post-processing, and video upsampling. Finally, a decoded smooth video is presented on the second terminal. In this way, the second terminal may obtain and display the video stream collected by the first terminal. It should be noted that, in some examples, a subsequent snapping action (for example, step 207) occurs before the video frame buffer is collected, to ensure that a high-definition image or a lossless image is snapped.

Step 205: The preview template management module 102 is provided for the user to select a template and a scenario/theme, and the preview picture editing module 107 is responsible for rendering and displaying. For example, a user of a first terminal may select, by using the preview template management module 102, a theme and a display mode of a screen picture that the user of the first terminal likes, for example, select a two-pane template (a left half region+a right half region) and a common border theme. The preview picture editing module 107 of the first terminal displays, in a default mode in the left half region, a real-time preview video stream (a part of the first video stream) of a shooting scenario (a first scenario) of the first terminal, and displays, in the right half region, a real-time preview video stream (a part of the second video stream) of a shooting scenario (a second scenario) of the second terminal. It should be understood that the actually displayed shooting scenario of the first terminal in the left half region is smaller than a shooting scenario in which the first terminal actually performs framing, and the actually displayed shooting scenario of the second terminal in the right half region is smaller than a shooting scenario in which the second terminal actually performs framing. The first terminal performs communication negotiation and data transmission with the preview template management module 102 of the second terminal by using the preview template management module 102, and sends, to the second terminal, a template and a scenario/theme that are used by the first terminal. Therefore, pictures displayed in the first terminal and the second terminal are consistent. An example is shown in FIG. 6. In another implementation process, selection of the template or the theme may alternatively be determined by the second terminal, so that a principle for the first terminal and the second terminal to display same preview pictures is similar, and details are not described herein again.

In a specific implementation process, in a video call, pictures are usually displayed based on a layout of a calling party and a called party, and a picture of the other party is mainly displayed. The pictures seen by the two parties are inconsistent. Therefore, the video call cannot be directly used for the remote collaborative group photographing. The second terminal needs to render and display a group photo preview picture according to a same rule. In this embodiment, the first terminal may be used as a reference, and a preview layout may be performed from left to right and from top to bottom according to a group photo joining sequence. For example, as shown in FIG. 7, a first user is arranged to a leftmost side when joining, a second user is arranged to a right side when joining, and a third user is arranged from top to bottom when joining. When a plurality of people participate, an initiator of a group photo may adjust a location of each user, for example, place a most important person in a most obvious location or a region with a largest area. In addition, the first terminal has a right to perform synchronous adjustment on a display layout of the second terminal, and the preview pictures of the first terminal and the second terminal are synchronously adjusted in real time. It should be understood that the shooting scenario in this embodiment of the present invention is not limited to a person, and also includes any other scenario on which photographing can be performed.

In addition, the first terminal and the second terminal may also switch between the front camera and the rear camera, to perform shooting by using different angles of view. Whether each terminal uses a front camera or a rear camera is determined by a user of each terminal.

In conclusion, any picture change is synchronously displayed in the first terminal and the second terminal. The first terminal performs communication negotiation and data transmission with the preview template management module 102 of the second terminal by using the preview template management module 102, determines a unified template that the first terminal and the second terminal use, and specifies a use policy of each region of the template. For example, a left half region is used to display the preview video stream of the first scenario of the first terminal, and a right half region is used to display the preview video stream of the second scenario of the second terminal. In addition, the preview picture may be further divided into several regions based on a quantity of group photo parties, a joining sequence, and/or a screen size of a mobile phone of a user.

In addition, the preview video stream of the first scenario displayed in the first terminal is obtained by the first terminal, and the preview video stream of the second scenario displayed in the first terminal is forwarded by the second terminal to the first terminal through the server. The preview video stream of the second scenario displayed in the second terminal is obtained by the second terminal, and the preview video stream of the first scenario displayed in the second terminal is forwarded by the first terminal to the second terminal through the server.

Step 206: The preview picture editing module 107 is provided for the user to adjust (translate/zoom/rotate) a picture of the user until the user is satisfied, and records a picture adjustment parameter: and each group photo party adjusts the preview picture synchronously. For example, after the first terminal and the second terminal establish the real-time video stream, the user may adjust a posture, an image size, and a presentation mode in real time based on an image seen by the user, until the user determines an image with which the user is satisfied and takes a snapshot (the action is completed in step 207). In this process, the first terminal records all operations of the user of the first terminal in this step, namely, a first picture adjustment parameter. Optionally, the second terminal may also record all operations of a user of the second terminal in this step, namely, a second picture adjustment parameter. These operations or picture adjustment parameters may be recorded and transmitted in a text form.

In a specific implementation process, a group photo of two parties is used as an example. A difference between heights, arm lengths, and field-of-view angles of mobile phone lenses that are of the two parties in the group photo usually causes a size mismatch or a position mismatch between preview pictures of the two parties, and very good poses and cooperation are not presented, for example, but not limited to that a person previewed on the first terminal is much smaller than a person previewed on the second terminal, a face previewed on the first terminal is much larger than a face previewed on the second terminal, or a person previewed on the first terminal and a person previewed on the second terminal are severely misplaced. Therefore, a corresponding picture in each terminal needs to be manually or automatically adjusted. The embodiments of the present invention propose the three modes: "default, manual, and intelligent", to perform picture adjustment on the preview window. In the default mode, the system automatically selects the central region of the collected image as the preview picture. In the manual mode, the user can adjust (translate/rotate/zoom) the preview picture of the terminal by using the gesture or menu. In the intelligent mode, the system automatically selects a preview picture region from the picture collected by the camera by using the technologies such as the region of interest recognition and the facial detection. The following describes the manual mode and the intelligent mode.

(1) Detailed description of manually adjusting a picture.

Figure 8:
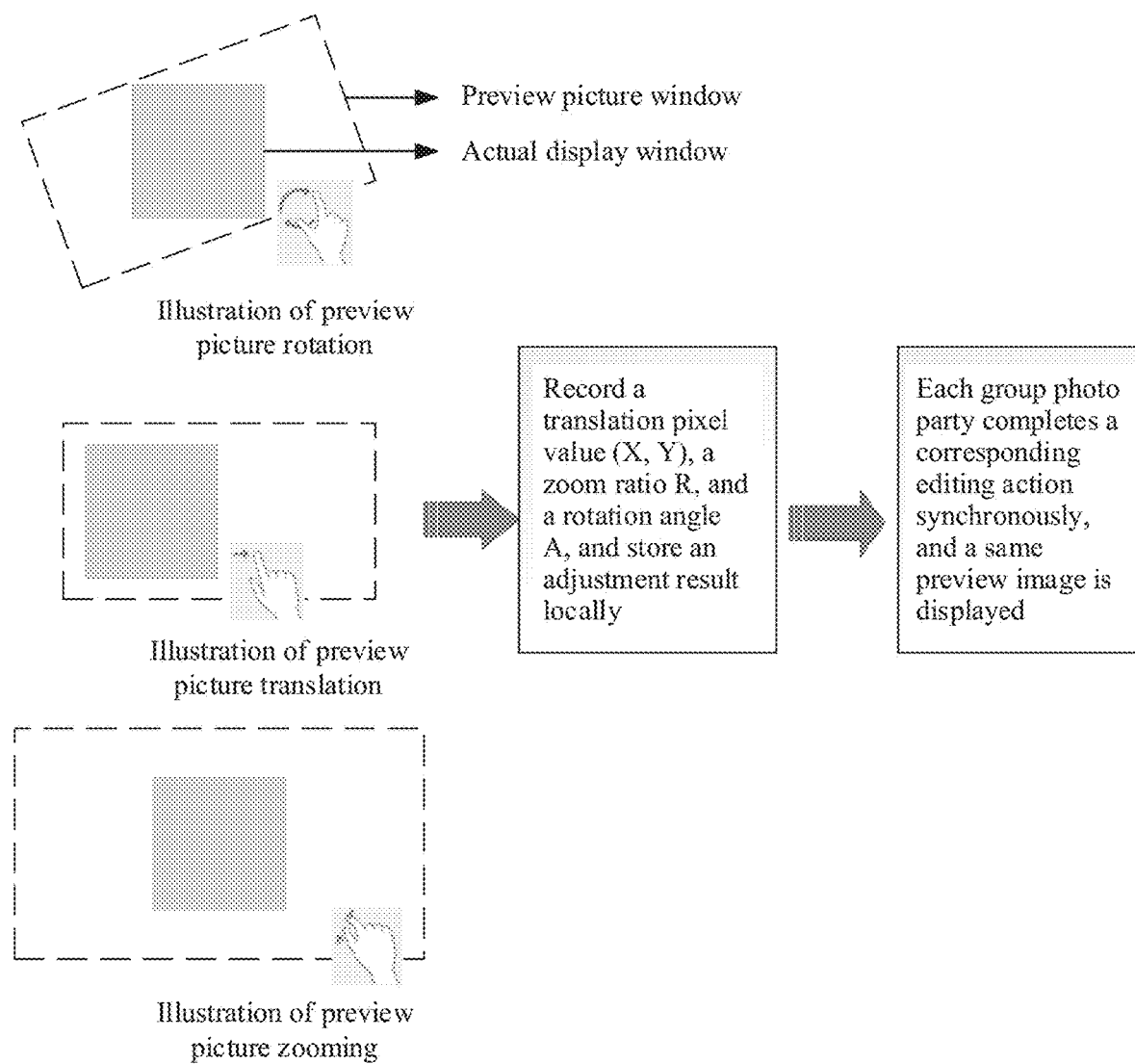
FIG. 8 is a schematic diagram of adjusting a preview picture by a user during remote group photographing according to an embodiment of the present invention.

As shown in FIG. 8, because a display window is smaller than a video preview picture, the user may adjust the preview picture of the user by using the gesture, including manners such as translating, zooming, rotating, and flipping. A translation pixel value (X, Y), a zoom ratio R, a rotation angle A. and a flipping angle B are recorded, and related parameters are stored locally for subsequent group photo generation. At the same time, the video communication engine sends an adjusted preview picture to each group photo party through a video stream, to keep preview pictures of the group photo parties consistent.

(2) Detailed description of intelligently adjusting a picture.

Regions of interest such as a face and a background are displayed on the display window through the region of interest recognition of an image. For example, when a group photo is taken, a face picture is automatically matched with the preview window by identifying a face region and a proportion of the face region. In this way, a purpose of automatically editing and cropping are achieved. In addition, in the intelligent picture adjustment mode, the user may select a portrait segmentation target by tapping, and drag a portrait of the other party in the group photo to a background of a local party, to implement a remote group photo with a same background, and an effect is shown in FIG. 9.

It should be understood that the first picture adjustment parameter may be understood as at least one of a corresponding zoom ratio, a rotation angle, a translation displacement, or a flipping angle when the first terminal snaps an image. The second picture adjustment parameter may be understood as at least one of a corresponding zoom ratio, a rotation angle, a translation displacement, or a flipping angle when the second terminal snaps an image. The first picture adjustment parameter may be understood as a sum of all picture adjustment parameters in a process from starting the group photo to taking the snapshot by the first terminal, namely, a variation of the at least one of a corresponding zoom ratio, a rotation angle, a translation displacement, or a flipping angle in the process. The second picture adjustment parameter may be understood as a sum of all picture adjustment parameters in a process from starting the group photo to taking the snapshot by the second terminal, namely, a variation of the at least one of a corresponding zoom ratio, a rotation angle, a translation displacement, or a flipping angle in the process.

For example, when the first terminal takes the snapshot, a picture scaling ratio is 2×, the rotation angle is 30° the translation displacement is (128, 128), and the flipping angle is 180°. These parameters may be recorded as first picture adjustment parameters. These parameters may be transmitted in the text form.

Step 207: The snapping control module 103 captures a high-definition image through the synchronous snapping or the asynchronous snapping. In a specific implementation process, when the user of the first terminal is satisfied with a current group picture, the snapping control module 103 may be used to trigger a snapping instruction/photographing instruction, and the snapping instruction is transmitted to the snapping control module 103 of the second terminal in real time. For example, in a process in which the user adjusts a posture, when the first terminal triggers photographing, the first terminal shoots the first scenario to obtain a first image, and synchronously, the second terminal shoots the second scenario to obtain a second image, to implement the synchronous snapping. The first image and the second image have not been compressed and encoded, and therefore have resolution higher than resolution of images in the first video stream and the second video stream. In another specific implementation process, the photographing instruction is controlled by both the snapping control module 103 of the first terminal and the snapping control module 103 of the second terminal. To be specific, the user of the first terminal can only control whether the first terminal performs photographing, and the user of the second terminal can only control whether the second terminal performs photographing, to implement the synchronous snapping. For example, in a process in which the user adjusts a posture, when the first terminal first triggers photographing, the first terminal shoots the first scenario to obtain a first image, and first scenario regions in display interfaces of the first terminal and the second terminal are frozen. Because the second terminal has not triggered photographing, second scenario regions in the display interfaces of the first terminal and the second terminal are still the real-time preview video stream of the second scenario. When the second terminal triggers photographing, the second terminal shoots the second scenario to obtain the second image, and the second scenario regions in the display interfaces of the first terminal and the second terminal are also frozen. In this case, pictures displayed on the display interfaces of the first terminal and the second terminal are pictures of the group photo, and may also be referred to as a group photo preview image.

In a specific implementation process, a synchronous snapping method may be: After a group photo party (initiator) sends a synchronous snapping command in manners such as a button, voice activation, or a gesture, each terminal performs, after each group photo party receives the snapping command, synchronous snapping to obtain a group photo effect of "what you see is what you get". A specific procedure is as follows.

The user sends the synchronous snapping command by using the manners such as the button, the voice activation, or the gesture. The command may be carried by using a video stream RTP extension header. To prevent a group photographing failure caused by a packet loss during transmission of the command, a repeated sending mode is used, and a quantity of repetition times is marked, until the group photo party successfully takes a snapshot and returns an ACK message. After receiving the snapping command, the group photo participant immediately takes a snapshot and captures a high-definition photo as required. If the snapping command is repeated, the group photo participant ignores the command.

In a specific implementation process, an asynchronous snapping method procedure is as follows.

When the group photo initiator sends an asynchronous snapping command in manners such as a button, voice activation, or a gesture, each group photo party can only take a snapshot of its own preview picture. The group photo party initiating the command immediately snaps a high-definition photo. After the photo is obtained, the group photo party initiating the command immediately sends an asynchronous snapping notification to another party, and can send, to the another party through the video communication engine, a timestamp TS at which the high-definition photo is snapped. After receiving the asynchronous snapping notification and the timestamp, the another group photo party freezes a corresponding picture of the group photo party on a display interface of a local terminal. A group photo is taken until pictures of all group photo parties are frozen.

In a specific implementation process, for a specific structure of a snapping command, refer to FIG. 10. The snapping command may include a user ID, a resolution identifier, a command number, and a quantity of command repetition times. Optionally, the snapping command may further include an asynchronous snapping frame timestamp. The user ID is used by the video communication engine during connection establishment and negotiation to correspond to an IP address and a port number. The resolution identifier is used to unify resolution of high-definition images snapped by terminals. For example, if a value of the field is 0, it indicates 4 k. If a value of the field is 1, it indicates 1080p. If a value of the field is 2, it indicates 720p. The command number indicates a snapping type. For example, that the value of the field is 1 indicates the synchronous snapping, and that the value of the field is 2 indicates the asynchronous snapping. The quantity of command repetition times: For example, a value may include any quantity of times from 0 to 128, indicating the quantity of command repetition times. A purpose of retransmission is to prevent the packet loss. The asynchronous snapping frame timestamp is used to store the timestamp at which the high-definition photo is captured through the asynchronous snapping, and is used by each group photo party to freeze a preview picture corresponding to the high-definition photo. This visually and intuitively feeds back images snapped by users.

In a specific implementation process, during synchronous snapping and asynchronous snapping, the first terminal and the second terminal may shoot, through field settings of the snapping command, an image by using same resolution, a same aspect ratio, a same shooting scenario, or a same another shooting parameter. In this way, quality of a finally synthesized group photo is more harmonious and unified.

Step 208: The file backhaul module 104 returns the captured high-definition photo and a corresponding operation to the group photo initiator. For example, the file backhaul module 104 of the second terminal returns the shot second image to the first terminal. Optionally, in step 208, the first terminal may transmit the first image to the second terminal, while the second terminal transmits the second image to the first terminal. Optionally, in step 208, the file backhaul module 104 of the first terminal may further return the shot first image to the second terminal. In addition, the first terminal may further forward the first picture adjustment parameter to the second terminal, and the second terminal may also forward the second picture adjustment parameter to the first terminal.

After the group photo is taken in the synchronous or asynchronous mode, the images snapped by the group photo parties are stored, in a lossless encoding mode, in terminal file systems of the group photo parties. File backhaul modules of the group photo participants transmit and aggregate high-definition photos to the group photo initiator by using the negotiated IP address and port number, for group photo generation.

Step 209: The group photo generation module 105 generates, based on the adjustment parameter recorded by the preview picture editing module 107, the group photo through cropping and slicing, to generate the effect of "what you see is what you get". For example, the group photo generation module 105 of the first terminal obtains a first sub-image based on the first picture adjustment parameter and the first image that are recorded in the preview picture editing module 107, so that the first image actually shot by the first terminal is changed to the first sub-image obtained after the user performs complex adjustment. The first sub-image includes a part of the first scenario in a final group picture. Similarly, the group photo generation module 105 of the first terminal obtains a second sub-image based on the second picture adjustment parameter (which may be forwarded to the first terminal along with the second image that the second terminal returns to the first terminal) and the second image that are recorded in the preview picture editing module 107 of the second terminal, so that the second image actually shot by the second terminal is changed to the second sub-image obtained after the user performs complex adjustment. The second sub-image includes a part of the second scenario in the final group picture. Finally, a high-definition group photo is generated based on the first sub-image, the second sub-image, and a preset template. The high-definition group photo is the same as the preview group photo displayed in the terminal when the user triggers group photographing. Optionally, a display screen of the first terminal replaces the original preview group photo with the high-definition group photo, and presents the high-definition group photo to the user. Further, the user of the first terminal may send the high-definition group photo to the user of the second terminal or another user.

In a specific implementation process, a group photo generation procedure may be as follows.

A group photo initiator obtains a high definition photo snapped by each group photo party and a corresponding preview picture editing parameter (namely, a picture adjustment parameter) that is recorded when each group photo party takes a snapshot. The photo of the group photo party is decoded into YUV data, and the photo of the group photo party are corresponding to adjustment parameters. The high-definition photo of each group photo party is edited and adjusted based on the adjustment parameter (at least one of a size of a display window, a position, a zoom ratio, a rotation angle, a translation pixel, or a flipping angle). An edited photo of each group photo party is spliced and encoded into a JPEG format photo, and a group photo result is presented on a display interface of a terminal of the group photo initiator.

Figure 11:
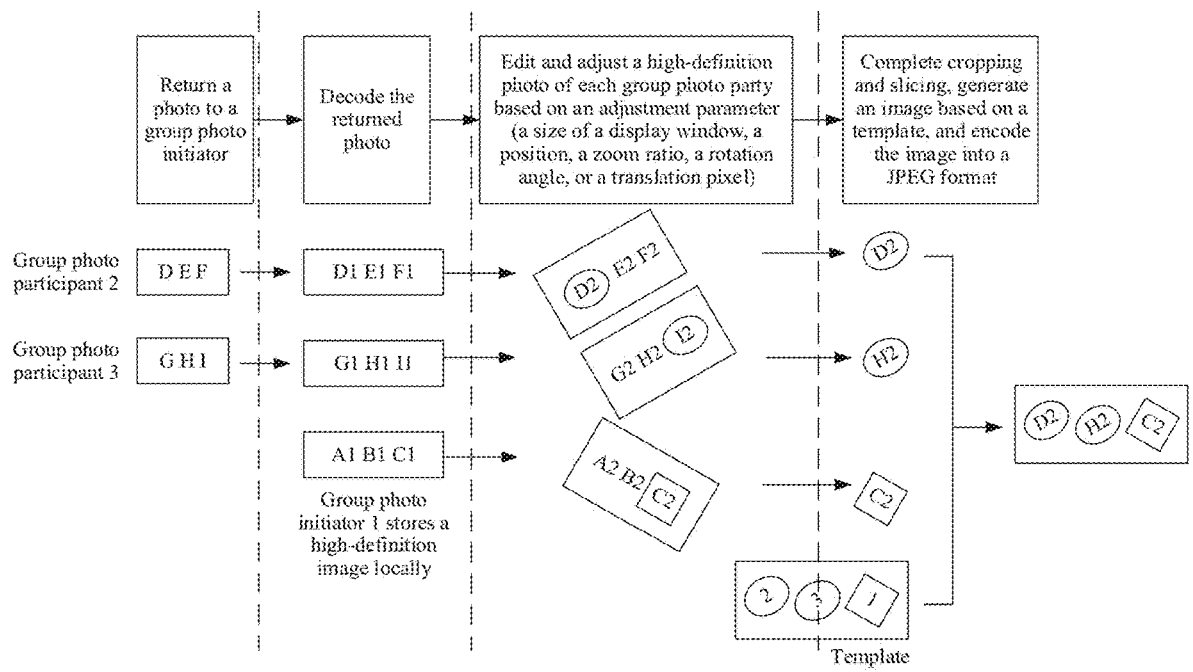
FIG. 11 is a schematic diagram of an example of remote group photographing according to an embodiment of the present invention.
Figure 12:
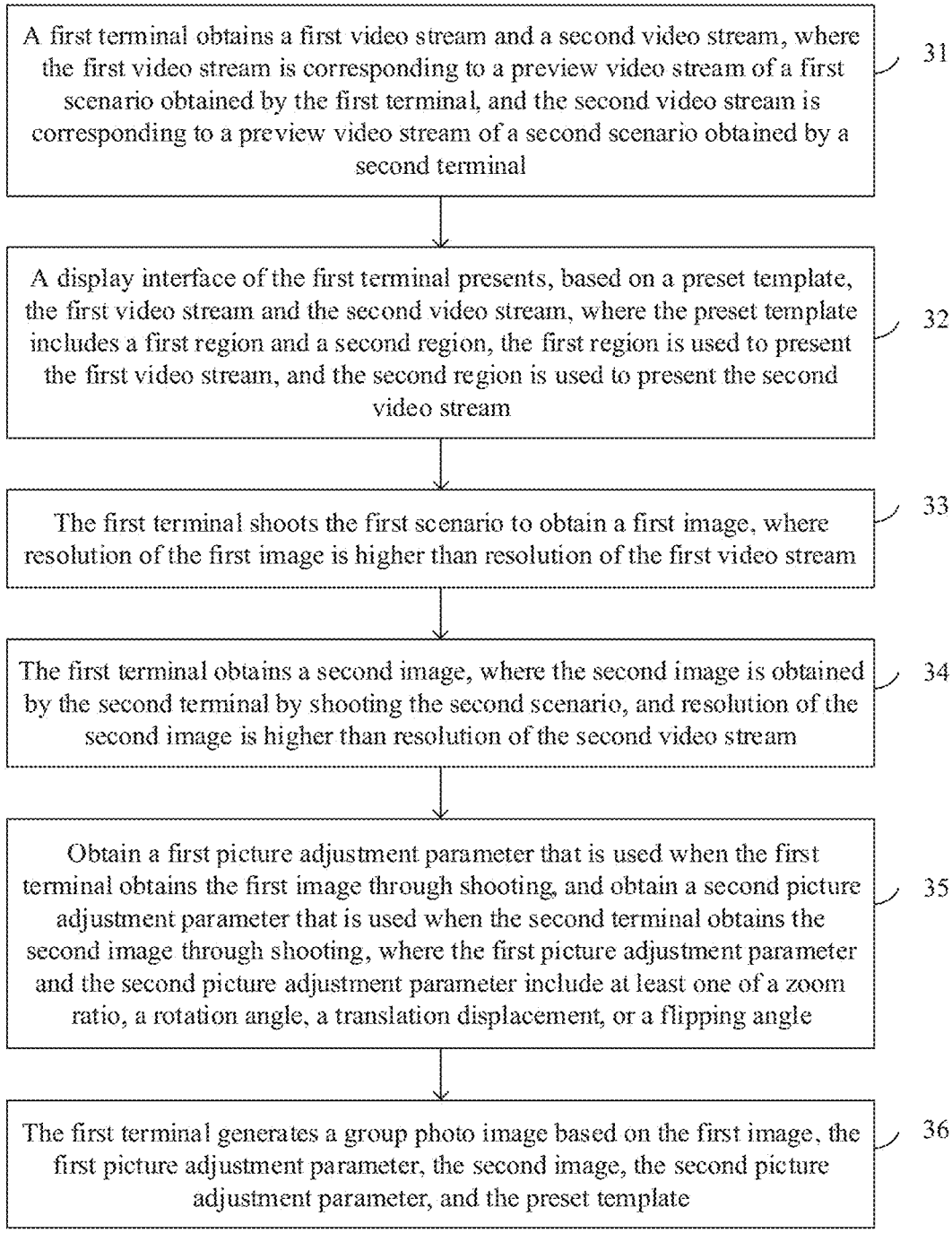
FIG. 12 is a flowchart of a remote group photographing method according to an embodiment of the present invention.

For an example, referring to FIG. 11, it is assumed that a group photo initiator 1 receives and decodes images returned by a group photo participant 2 and a group photo participant 3, to obtain high-definition images. Content of a high-definition image from the group photo participant 2 includes D1, E1, and F1, and content of a high-definition image from the group photo participant 3 includes G1, H1, and I1. Because a high-definition image snapped by the group photo initiator is stored locally, the high-definition image does not need to be returned, and content of the high-definition image of the group photo initiator 1 includes A1, B1, and C1, D1, E1, and F1 are correspondingly changed to D2, E2, and F2 based on a series of picture adjustment parameters from the group photo participant 2, such as a rotation angle, a zoom multiple, or a translation displacement. G1, H1, and I1 are correspondingly changed to G2, H2, and I2 based on a series of picture adjustment parameters from the group photo participant 3, such as a rotation angle, a zoom multiple, or a translation displacement. A1, B1, and C1 are correspondingly changed to A2, B2, and C2 based on a series of picture adjustment parameters from the group photo initiator 1, such as a rotation angle, a zoom multiple, or a translation displacement. Local regions of D2, H2, and C2 are correspondingly cropped based on a theme in a template and a picture layout of each group photo party. Then, a high-definition group photo is obtained through splicing based on D2, H2, C2, and the theme in the template, and is encoded into images in different formats, for example, JPEG.

FIG. 2 is used as an example. Both the first terminal and the second terminal are group photo participants. An optional embodiment of the present invention is described in detail by using an example in which the first terminal is a group photo initiator and the second terminal is a group photo responder. An embodiment of the present invention provides a photographing method. The method is applied to a photographing terminal, and the method includes the following steps.

Step 31: A first terminal obtains a first video stream and a second video stream, where the first video stream is corresponding to a preview video stream of a first scenario obtained by the first terminal, and the second video stream is corresponding to a preview video stream of a second scenario obtained by a second terminal. That is, the first video stream is a preview video stream locally generated by the first terminal after group photographing is enabled, and the second video stream is a preview video stream that is generated and sent by the second terminal after the second terminal participates in group photographing.

In addition, at the same time, the second terminal may also obtain the first video stream and the second video stream.

For a specific implementation of step 31, refer to some or all descriptions of step 204.

Step 32: Present, based on a preset template, the first video stream and the second video stream on a display interface of the first terminal, where the preset template includes a first region and a second region, the first region is used to present the first video stream, and the second region is used to present the second video stream.

It should be understood that because the first region and the second region are usually smaller than display interfaces, the first region and the second region may display partial or all content of the first video stream and the second video stream. Specifically, content displayed in the first region may be less than content of the first scenario displayed by the first terminal, and content displayed in the second region may be less than content of the second scenario displayed by the second terminal.

In addition, the first terminal may perform communication negotiation with the second terminal by using a same template, and unify layouts of the first video stream and the second video stream. Therefore, content of preview pictures displayed on the display interfaces of the first terminal and the second terminal is consistent, that is, content of group photo regions is consistent. Optionally, consistency of the preview pictures may be maintained until a group photo is taken.

For a specific implementation of step 32, refer to some or all descriptions of step 205.

Step 33: The first terminal shoots the first scenario to obtain a first image, where resolution of the first image is higher than resolution of the first video stream.

Step 34: The first terminal obtains a second image, where the second image is obtained by the second terminal by shooting the second scenario, and resolution of the second image is higher than resolution of the second video stream.

For specific implementations of step 33 and step 34, refer to some or all descriptions of step 207 and step 208.

Step 35: Obtain a first picture adjustment parameter that is used when the first terminal obtains the first image through shooting, and obtain a second picture adjustment parameter that is used when the second terminal obtains the second image through shooting, where the first picture adjustment parameter and the second picture adjustment parameter include at least one of a zoom ratio, a rotation angle, a translation displacement, or a flipping angle.

In a specific implementation process, when previewing a shooting scenario, a user may adjust the scenario, for example, perform an operation such as zooming, translation, rotation, or flipping. Certainly, any adjustment technology in a PS technology may be further included, to achieve an effect expected by the user. In this embodiment of the present invention, a terminal records all operation effects before the user adjusts a snapshot. Corresponding to the foregoing embodiment, the first terminal records the first picture adjustment parameter, and the second terminal may record the second picture adjustment parameter and transmit the second picture adjustment parameter to the first terminal. In a specific implementation process, the first terminal may communicate with the second terminal, and the first picture adjustment parameter and the second picture adjustment parameter may be sent bidirectionally or unidirectionally in a text form.

For a specific implementation of step 35, refer to some or all descriptions of step 206.

Step 36: The first terminal generates a group photo image based on the first image, the first picture adjustment parameter, the second image, the second picture adjustment parameter, and the preset template.

In a specific implementation process, the first terminal determines a first sub-image based on the first image, the first picture adjustment parameter, and the first region. Specifically, the first image actually shot by the first terminal is changed, based on the first picture adjustment parameter, to an image state when the user takes a snapshot. Further, the first image is cropped based on the first region, to obtain a sub-image of the first region on the display interface of the terminal when the snapshot is taken. The first terminal determines a second sub-image based on the second image, the second picture adjustment parameter, and the second region. Specifically, the second image actually shot by the second terminal is changed, based on the second picture adjustment parameter, to an image state when the user takes a snapshot. Further, the second image is cropped based on the second region, to obtain a sub-image of the second region on the display interface of the terminal when the snapshot is taken. The first terminal generates the group photo image based on the first sub-image, the second sub-image, and the preset template. Specifically, the first terminal splices the sub-image of the first region and the sub-image of the second region into the template to generate the final group photo, and generate a picture format.

For a specific implementation of step 36, refer to some or all descriptions of step 209.

The present invention proposes a group photo solution based on remote collaboration (interaction). The group photo solution provided in this embodiment of the present invention is close to a real scenario, and provides a real-time preview template management method, so that preview pictures of all group photo participants may be consistent, and a local preview effect is simulated. At the same time, a preview picture editing method and a preview image synchronizing method are proposed, and a synchronous and asynchronous snapping method is also proposed. This is more interactive and interesting for all group photo parties. In addition, a high-definition image snapping mode makes image quality similar to image quality of a single-machine local group photo, which is much higher than image quality of a video screenshot. In particular, the present invention proposes a method for editing a preview picture and generating a group photo, where a picture adjustment parameter used when a user snaps an image needs to be recorded, and a related parameter is edited for generating a group photo later. This ensures that a group photo generation picture is the same as a preview group photo picture when a snapshot is taken, improves flexibility and interest of the user in adjusting a shooting posture, and increases operability to give full play to imagination of the user. This resolves a problem in the prior art that a real-time preview cannot be performed, expression framing is difficult, and quality of a group photo is low, thereby achieving user experience of "what you see is what you get". Currently, quality of mobile phone photographing and video recording has been greatly improved. It is easier to attract users and improve user loyalty through service innovation. With evolution of terminal performance and 5G technologies, a remote group photographing mode different from a conventional remote group photographing mode becomes a possibility.

Figure 13:
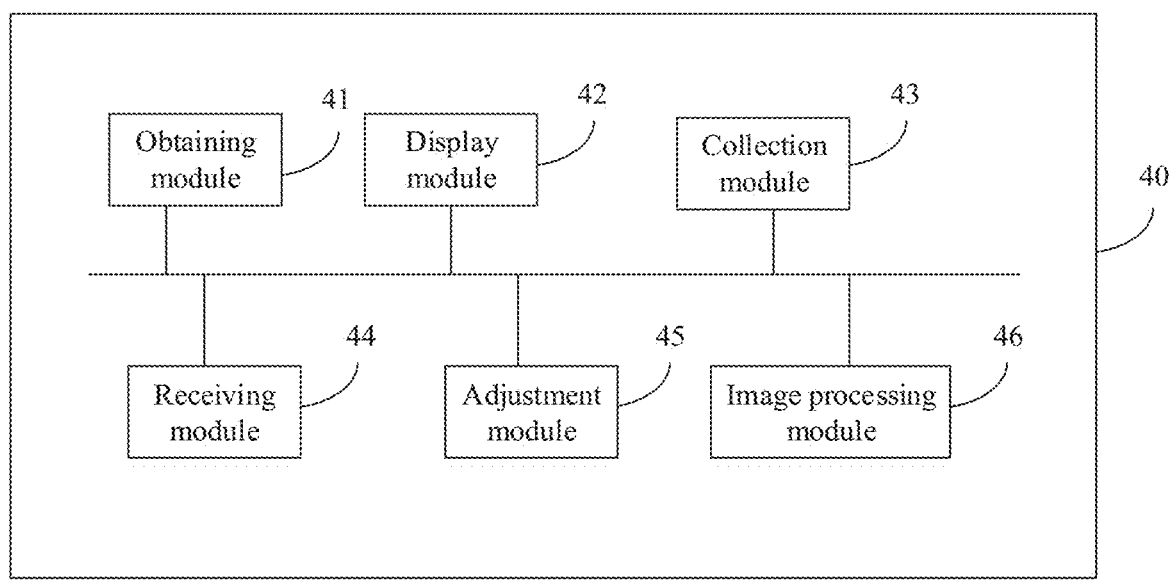
FIG. 13 is a schematic diagram of a remote group photographing apparatus according to an embodiment of the present invention.

Based on the photographing method provided in the foregoing embodiment, an embodiment of the present invention provides a photographing apparatus 40. The apparatus 40 may be applied to various photographing devices. As shown in FIG. 13, the apparatus 40 includes an obtaining module 41, a display module 42, a collection module 43, a receiving module 44, an adjustment module 45, and an image processing module 46.

The obtaining module 41 is configured to obtain a first video stream and a second video stream. The first video stream is corresponding to a preview video stream of a first scenario obtained by the first terminal, and the second video stream is corresponding to a preview video stream of a second scenario obtained by a second terminal. The obtaining module 41 may be implemented by a processor by invoking a corresponding program instruction to obtain local data and network transmission data.

The display module 42 is configured to present, based on a preset template, the first video stream and the second video stream on a display interface of the first terminal. The preset template includes a first region and a second region, the first region is used to present the first video stream, and the second region is used to present the second video stream. The display module 42 may be implemented by the processor by invoking a program instruction in a memory to arrange display data.

The collection module 43 is configured to shoot the first scenario to obtain a first image. Resolution of the first image is higher than resolution of the first video stream. The collection module 43 may be implemented by the processor by invoking a sensor and a camera to perform shooting. A collected image is stored in the memory.

The receiving module 44 is configured to obtain a second image. The second image is obtained by the second terminal by shooting the second scenario, and resolution of the second image is higher than resolution of the second video stream. The receiving module 44 may be implemented by the processor by invoking a corresponding program instruction to obtain network transmission data.

The adjustment module 45 is configured to: obtain a first picture adjustment parameter that is used when the first terminal obtains the first image through shooting, and obtain a second picture adjustment parameter that is used when the second terminal obtains the second image through shooting. The first picture adjustment parameter and the second picture adjustment parameter include at least one of a zoom ratio, a rotation angle, a translation displacement, or a flipping angle. The adjustment module 45 may be implemented by the processor by invoking a corresponding program instruction to obtain local data and network transmission data.

The image processing module 46 is configured to generate a group photo image based on the first image, the first picture adjustment parameter, the second image, the second picture adjustment parameter, and the preset template. The image processing module 46 may be implemented by the processor by invoking data and an algorithm in a local memory or a cloud server, to perform corresponding calculation, and output a picture that is of a target scenario and that is expected by an end user.

The apparatus may further include a control module 47, configured to control a display interface of the second terminal to present the first video stream and the second video stream based on the preset template. A mode in which the second terminal presents the first video stream and the second video stream is the same as a mode in which the first terminal presents the first video stream and the second video stream. Before a group photo is taken, video streams of the two terminals are displayed in real time. In this way, group photo participants can clearly perceive postures of all user participants, implementing "what you see is what you get".

In a specific implementation process, the obtaining module 41 is specifically configured to perform the method mentioned in step 31 and a method that can be equivalently replaced. The display module 42 is specifically configured to perform the method mentioned in step 32 and a method that can be equivalently replaced. The collection module 43 is specifically configured to perform the method mentioned in step 33 and a method that can be equivalently replaced. The receiving module 44 is specifically configured to perform the method mentioned in step 34 and a method that can be equivalently replaced. The adjustment module 45 is specifically configured to perform the method mentioned in step 35 and a method that can be equivalently replaced. The image processing module 46 is specifically configured to perform the method mentioned in step 36 and a method that can be equivalently replaced.

It should be understood that the foregoing specific method embodiments, explanations and descriptions of technical features in the embodiments, and extensions of a plurality of implementations are also applicable to corresponding method execution in the apparatus, and details are not described in the apparatus embodiment.

It should be understood that division into the modules in the foregoing apparatus 40 is merely logical function division, and in an actual implementation, some or all of the modules may be integrated into one physical entity, or may be physically separated. For example, each of the foregoing modules may be a separate processing element, or may be integrated on a chip of a terminal, or may be stored in a storage element of a controller in a form of program code, and a processing element of the processor invokes and executes a function of each of the foregoing modules. In addition, the modules may be integrated or may be implemented independently. The processing element herein may be an integrated circuit chip and has a signal processing capability. In an implementation process, steps in the foregoing methods or the foregoing modules can be implemented by using a hardware integrated logical circuit in the processing element, or by using instructions in a form of software. The processing element may be a general-purpose processor, for example, a central processing unit (English: central processing unit, CPU for short), or may be one or more integrated circuits configured to implement the foregoing methods, for example, one or more application-specific integrated circuits (English: application-specific integrated circuit, ASIC for short), one or more digital signal processors (English: digital signal processor, DSP for short), or one or more field programmable gate arrays (English: field programmable gate array, FPGA for short).

It should be understood that in the specification, claims, and accompanying drawings of the present invention, the terms "first", "second", and so on are intended to distinguish between similar objects but do not necessarily indicate a specific order or sequence. It should be understood that the data used in such a way are interchangeable in proper circumstances so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those modules, but may include other modules not expressly listed or inherent to such a process, method, system, product, or device.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device thereby generating computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, persons skilled in the art can make changes and modifications to these embodiments once they learn a basic inventive concept. Therefore, the following claims are intended to be construed as to cover the embodiments and all changes and modifications falling within the scope of the present invention. Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A photographing method, wherein the method comprises:
obtaining, by a first terminal, a first video stream and a second video stream, wherein the first video stream corresponds to a preview video stream of a first scenario obtained by the first terminal, and the second video stream corresponds to a preview video stream of a second scenario obtained by a second terminal;
presenting, based on a preset template, the first video stream and the second video stream on a display interface of the first terminal, wherein the preset template comprises a first region and a second region, the first region is used to present the first video stream, and the second region is used to present the second video stream;
shooting, by the first terminal, the first scenario to obtain a first image, wherein resolution of the first image is higher than resolution of the first video stream;
obtaining, by the first terminal, a second image, wherein the second image is obtained by the second terminal by shooting the second scenario, and resolution of the second image is higher than resolution of the second video stream;
obtaining, by the first terminal, a first picture adjustment parameter that is used when the first terminal obtains the first image through shooting;
obtaining, by the first terminal, a second picture adjustment parameter that is used when the second terminal obtains the second image through shooting, wherein the first picture adjustment parameter and the second picture adjustment parameter comprise at least one of a zoom ratio, a rotation angle, a translation displacement, or a flipping angle; and
generating, by the first terminal, a group photo image based on the first image, the first picture adjustment parameter, the second image, the second picture adjustment parameter, and the preset template.

2. The method according to claim 1, wherein when the first video stream and the second video stream are presented on the display interface of the first terminal based on the preset template, the photographing method further comprises:
controlling, by the first terminal, a display interface of the second terminal to present the first video stream and the second video stream based on the preset template, wherein a mode in which the second terminal presents the first video stream and the second video stream is the same as a mode in which the first terminal presents the first video stream and the second video stream.

3. The method according to claim 1, wherein the shooting, by the first terminal, the first scenario to obtain a first image comprises:
receiving, by the first terminal, a first snapping instruction, and shooting the first scenario to obtain the first image; and
wherein the obtaining, by the first terminal, a second image comprises:
forwarding, by the first terminal, the first snapping instruction to the second terminal, to enable the second terminal to shoot the second scenario to obtain the second image, and send the second image to the first terminal; and
receiving, by the first terminal, the second image sent by the second terminal.

4. The method according to claim 3, wherein the receiving, by the first terminal, a first snapping instruction, and shooting the first scenario to obtain the first image comprises:
invoking, by the first terminal, a photographing function to shoot the first scenario at a first snapping instruction time point to obtain the first image; or
finding, by the first terminal in a video collection buffer, an uncoded buffered image that is of the first scenario and that is corresponding to the first snapping instruction time point, and using the buffered image as the first image.

5. The method according to claim 1, wherein the shooting, by the first terminal, the first scenario to obtain a first image comprises:
receiving, by the first terminal, a first snapping instruction, and shooting the first scenario to obtain the first image; and
wherein the obtaining, by the first terminal, a second image comprises:
receiving, by the second terminal, a second snapping instruction, shooting the second scenario to obtain the second image, and sending the second image to the first terminal; and
receiving, by the first terminal, the second image.

6. The method according to claim 1, wherein the resolution and an aspect ratio of the second image are the same as the resolution and an aspect ratio of the first image.

7. The method according to claim 1, wherein the generating, by the first terminal, a group photo image based on the first image, the first picture adjustment parameter, the second image, the second picture adjustment parameter, and the preset template comprises:
determining, by the first terminal, a first sub-image based on the first image, the first picture adjustment parameter, and the first region;
determining, by the first terminal, a second sub-image based on the second image, the second picture adjustment parameter, and the second region; and
generating, by the first terminal, the group photo image based on the first sub-image, the second sub-image, and the preset template.

8. A photographing apparatus, wherein the photographing apparatus is located in a first terminal, and the photographing apparatus comprises at least one processor configured to execute instructions stored in a memory, wherein the instructions instruct the at least one processor to cause the photographing apparatus to:
obtain a first video stream and a second video stream, wherein the first video stream corresponds to a preview video stream of a first scenario obtained by the first terminal, and the second video stream corresponds to a preview video stream of a second scenario obtained by a second terminal;
present, based on a preset template, the first video stream and the second video stream on a display interface of the first terminal, wherein the preset template comprises a first region and a second region, the first region is used to present the first video stream, and the second region is used to present the second video stream;
shoot the first scenario to obtain a first image, wherein resolution of the first image is higher than resolution of the first video stream;
obtain a second image, wherein the second image is obtained by the second terminal by shooting the second scenario, and resolution of the second image is higher than resolution of the second video stream;

obtain a first picture adjustment parameter that is used when the first terminal obtains the first image through shooting, and obtain a second picture adjustment parameter that is used when the second terminal obtains the second image through shooting, wherein the first picture adjustment parameter and the second picture adjustment parameter comprise at least one of a zoom ratio, a rotation angle, a translation displacement, or a flipping angle; and generate a group photo image based on the first image, the first picture adjustment parameter, the second image, the second picture adjustment parameter, and the preset template.

9. The photographing apparatus according to claim 8, wherein the instructions instruct the at least one processor to cause the photographing apparatus to control a display interface of the second terminal to present the first video stream and the second video stream based on the preset template, wherein a mode in which the second terminal presents the first video stream and the second video stream is the same as a mode in which the first terminal presents the first video stream and the second video stream.

10. The photographing apparatus according to claim 8, wherein the instructions instruct the at least one processor to cause the photographing apparatus to:
receive a first snapping instruction, and shoot the first scenario to obtain the first image;
forward the first snapping instruction to the second terminal, to enable the second terminal to shoot the second scenario to obtain the second image, and send the second image to the first terminal; and
receive the second image sent by the second terminal.

11. The photographing apparatus according to claim 8, wherein the instructions instruct the at least one processor to cause the photographing apparatus to:
receive a first snapping instruction, and shoot the first scenario to obtain the first image; and
when the second terminal receives a second snapping instruction, shoot the second scenario to obtain the second image, and sends the second image to the first terminal, receive the second image.

12. The photographing apparatus according to claim 8, wherein the instructions instruct the at least one processor to cause the photographing apparatus to:
invoke a photographing function to shoot the first scenario at a first snapping instruction time point to obtain the first image; or
find, in a video collection buffer, an uncoded buffered image that is of the first scenario and that is corresponding to the first snapping instruction time point, and use the buffered image as the first image.

13. The photographing apparatus according to claim 8, wherein the resolution and an aspect ratio of the second image are the same as the resolution and an aspect ratio of the first image.

14. The photographing apparatus according to claim 8, wherein the instructions instruct the at least one processor to cause the photographing apparatus to:
determine a first sub-image based on the first image, the first picture adjustment parameter, and the first region;
determine a second sub-image based on the second image, the second picture adjustment parameter, and the second region; and
generate the group photo image based on the first sub-image, the second sub-image, and the preset template.

15. A terminal device, wherein the terminal device comprises a memory, a processor, a bus, a camera, and a transceiver, wherein the memory, the camera, the transceiver, and the processor are connected through the bus;
the camera is configured to collect an image signal under control of the processor;
the transceiver is configured to receive and send an instruction and data;
the memory is configured to store a computer program and an instruction; and
the processor is configured to invoke the computer program and the instruction that are stored in the memory to control the camera and the transceiver, and is further configured to enable the terminal device to perform:
obtaining, by the terminal device, a first video stream and a second video stream, wherein the first video stream corresponds to a preview video stream of a first scenario obtained by the terminal device, and the second video stream corresponds to a preview video stream of a second scenario obtained by a second terminal device;
presenting, based on a preset template, the first video stream and the second video stream on a display interface of the terminal device, wherein the preset template comprises a first region and a second region, the first region is used to present the first video stream, and the second region is used to present the second video stream;
shooting, by the terminal device, the first scenario to obtain a first image, wherein resolution of the first image is higher than resolution of the first video stream;
obtaining, by the terminal device, a second image, wherein the second image is obtained by the second terminal device by shooting the second scenario, and resolution of the second image is higher than resolution of the second video stream;
obtaining, by the terminal device, a first picture adjustment parameter that is used when the terminal device obtains the first image through shooting;
obtaining, by the terminal device, a second picture adjustment parameter that is used when the second terminal device obtains the second image through shooting, wherein the first picture adjustment parameter and the second picture adjustment parameter comprise at least one of a zoom ratio, a rotation angle, a translation displacement, or a flipping angle; and
generating, by the terminal device, a group photo image based on the first image, the first picture adjustment parameter, the second image, the second picture adjustment parameter, and the preset template.

* * * * *